United States Patent [19]
Nakagawa

[11] Patent Number: 5,222,015

[45] Date of Patent: Jun. 22, 1993

[54] INVERTER POWER SUPPLY WITH INPUT POWER DETECTION MEANS

[75] Inventor: Tatsuya Nakagawa, Tokyo, Japan

[73] Assignee: Kabushiki Kaisha Toshiba, Kawasaki, Japan

[21] Appl. No.: 889,103

[22] Filed: May 27, 1992

[30] Foreign Application Priority Data

May 31, 1991 [JP] Japan .................................. 3-129884
Sep. 17, 1991 [JP] Japan .................................. 3-236278

[51] Int. Cl.$^5$ .......................................... H02M 3/335
[52] U.S. Cl. .................................... 363/21; 363/95; 363/97; 363/131
[58] Field of Search ................ 363/21, 95, 97, 131

[56] References Cited

U.S. PATENT DOCUMENTS

| 4,244,015 | 1/1981 | Beebe ..................... | 363/97 |
| 4,777,575 | 10/1988 | Yamato et al. ........... | 363/21 |
| 4,942,509 | 7/1990 | Shires et al. ............ | 363/97 |

FOREIGN PATENT DOCUMENTS

63-190557 8/1988 Japan .
2-100116 4/1990 Japan .

Primary Examiner—Steven L. Stephan
Assistant Examiner—Jeffrey Sterrett
Attorney, Agent, or Firm—Foley & Lardner

[57] ABSTRACT

An inverter power supply, for driving a magnetron or the like, where an A.C. voltage from a commercial A.C. power source is rectified to obtain a D.C. voltage which then is switched periodically by a switching device to be converted to a high frequency which then is converted to a D.C. to obtain a predetermined D.C. output. The inverter power supply includes a modulation circuit for amplitude-modulating an output control voltage responsive to the an output value of the D.C. output by an A.C. input voltage from the commercial A.C. power source to obtain an object input waveform; a difference output circuit for taking difference between the object input waveform obtained by the modulation circuit and an input current waveform from the commercial A.C. power source; and a control circuit for controlling an ON period of the switching device responsive to a difference output from the difference output circuit.

4 Claims, 7 Drawing Sheets

LINEAR CHOPPING WAVE OSCILLATION OUTPUT

INVERTER POWER SUPPLY WITH INPUT POWER DETECTION MEANS

BACKGROUND OF THE INVENTION

1. Field of the Invention

The present invention relates to an inverter power supply which drives a magnetron and as used for microwave ovens.

2. Description of the Prior Art

Figure 1:
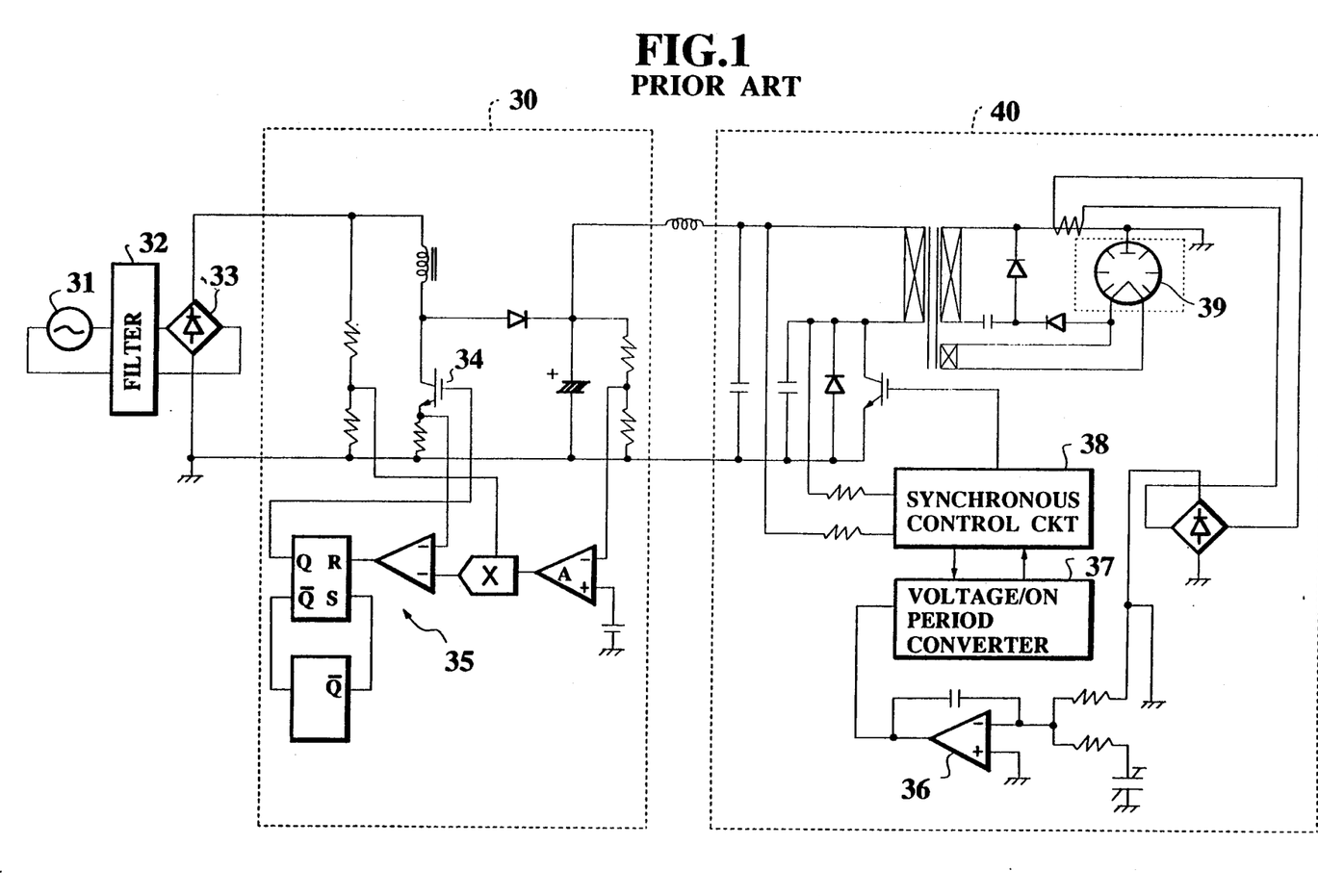
FIG. 1 shows a circuit diagram of a conventional inverter power supply.

In an inverter power supply which drives a magnetron and fluorescent light, an A.C. input current waveform from a commercial A.C. power supply doesn't present a sinusoidal waveform congruent to an A.C. input voltage waveform, due to a nonlinear characteristic of voltage-current of a load and a rectifying-smoothing circuit of capacitor input type. In a familiar case, when an air condition is on with full power on a hot summer day and a microwave is on as well, other electric appliances at home, such as a television set sometimes do not operate as they should. This is because when the air condition and microwave oven consume high power, this can cause a television set to operate somehow not perfect, for example images on the television is not clear as they should be. In particular, due to the rectifying-smoothing circuit, a peak-type wave form is produced instead. As a result, a power factor of the A.C. input is deteriorated. To alleviate such a drawback, there has been conventionally considered an inverter power supply utilizing an active filter 32 in an input rectifying circuit as shown in FIG. 1. In the conventional apparatus, there are provided the first inverter 30 and the second inverter 40 encircled in dotted lines in FIG. 1. Precisely speaking, the second inverter 40 is indicated as encircled with the dotted line excluding a magnetron 39. Referring still to FIG. 1, A.C. voltage from a commercial AC power supply 31 is rectified by a rectifying bridge 33 in the inverter 30, then is switched periodically by a first switching element 34 to be converted to a high frequency. Then, an envelope of the switching current is controlled by a PWM (Pulse Width Modulation) control so that the envelope is congruent to the waveform of the A.C. input voltage, and an averaged value of the input voltage over the second inverter 40 is controlled at a constant level. The second inverter 40 is such that the input electric power to the magnetron 39 is controlled at a constant level according to the drive condition, by an electric power error integrator 36, a voltage/ON-period converter 37, a synchronous control circuit 38 and so on.

Figure 2:
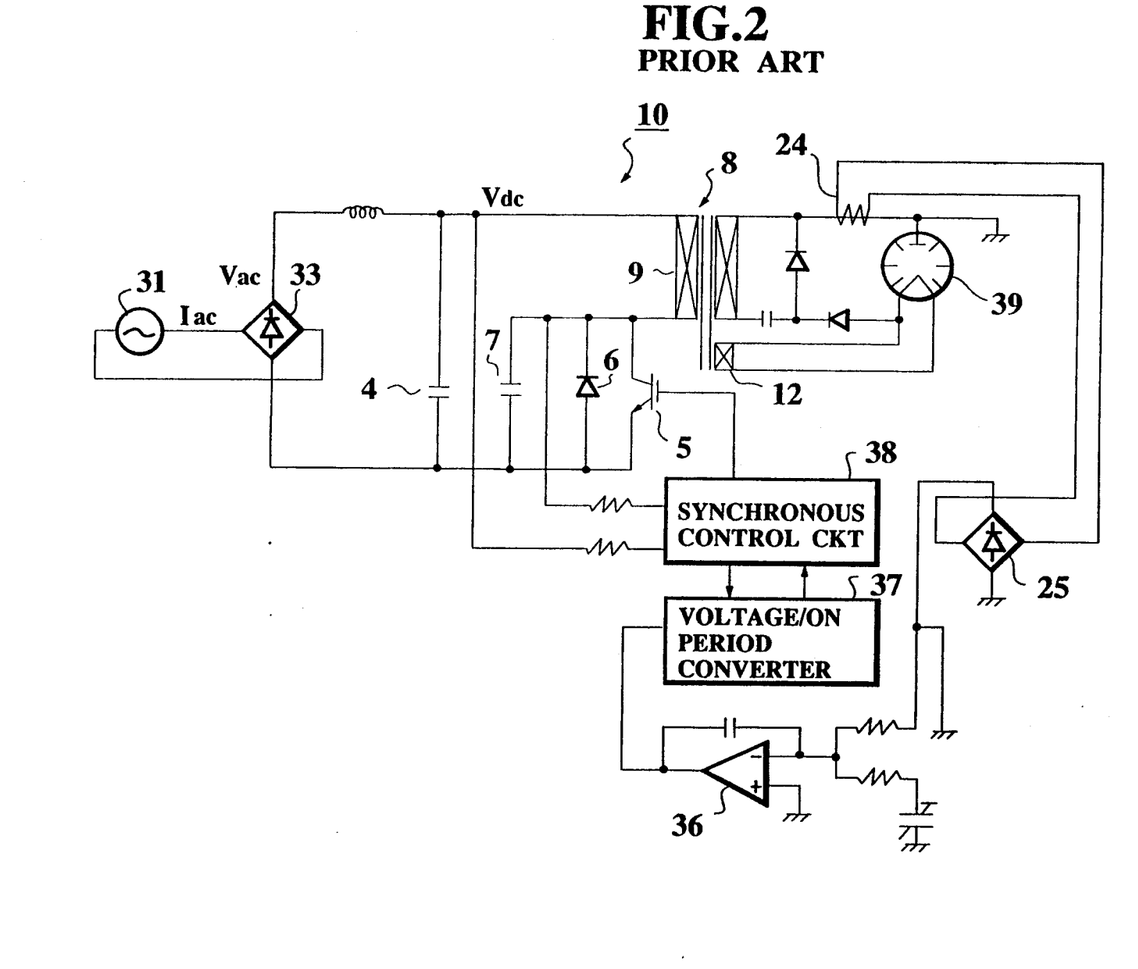
FIG. 2 shows a circuit diagram of a high-frequency power converter in a conventional power supply.

In connection with the aforementioned, FIG. 2 shows a conventional high-frequency power converter employing a method for controlling an anode current of the magnetron 39 at a constant level. In the high-frequency power converter, there is provided a control system for controlling an input power supplied to the magnetron 39 at a constant level. A current transformer 24 for detecting the averaged value of anode current is connected between a voltage doubler rectifier circuit 101 (not shown in FIG. 2) and an anode of the magnetron 39. Note that the voltage doubler rectifier circuit 101 can be seen in FIG. 5. A detection output of the current transformer 24 is converted to a D.C. voltage by a rectifier and is sent to an inversion input terminal (−) of an input power error integrator 36. Then, the power error from the input power error integrator 36 is controlled to be nil. As a result, the anode current of the magnetron 39 is controlled at a constant level and the input power is thus controlled at a constant value.

In the conventional inverter power supply, the first inverter and the second inverter are connected in series, so that its efficiency is a multiplied result of each efficiency, say, 90% times 90% making 81% which is a deterioration from the single efficiency of 90%. Further, there are more items of parts necessary and its physical size becomes bigger overall, thus causing complexity in construction and a cost increase. Moreover, since the switching frequency of the two inverters varies independently from each other, the operation frequency for each inverter must be differed a great deal, namely at least by 20 kHz, in order to have the difference in frequency set outside the audible frequency range. As a result, a switching loss is remarkable, especially in the inverter having a greater operation frequency.

SUMMARY OF THE INVENTION

In view of the foregoing problems, it is therefore an object of the present invention to provide an inverter power supply with a simple construction accompanied with an improvement on the output control as well as the power factor of A.C. input, and an increased overall efficiency.

To achieve the object, there is provided an inverter power supply where an A.C. voltage, from a commercial A.C. power source is rectified to obtain a D.C. voltage which then is switched periodically by a switching device to be converted to a high frequency which then is converted to a D.C. to obtain a predetermined D.C. output. The comprising: apparatus includes modulation means for amplitude-modulating an output control voltage responsive to an output value of the D.C. output by an A.C. input voltage from the commercial A.C. power source to obtain an object input waveform; difference output means for taking the difference between the object input waveform obtained by the modulation means and an input current waveform from the commercial A.C. power source; and control means for controlling an ON period of the switching device responsive to a difference output from the difference output means.

Other features and advantages of the present invention will become apparent from the following description taken in conjunction with the accompanying drawings.

DETAILED DESCRIPTION OF THE PREFERRED EMBODIMENTS

Figure 3:
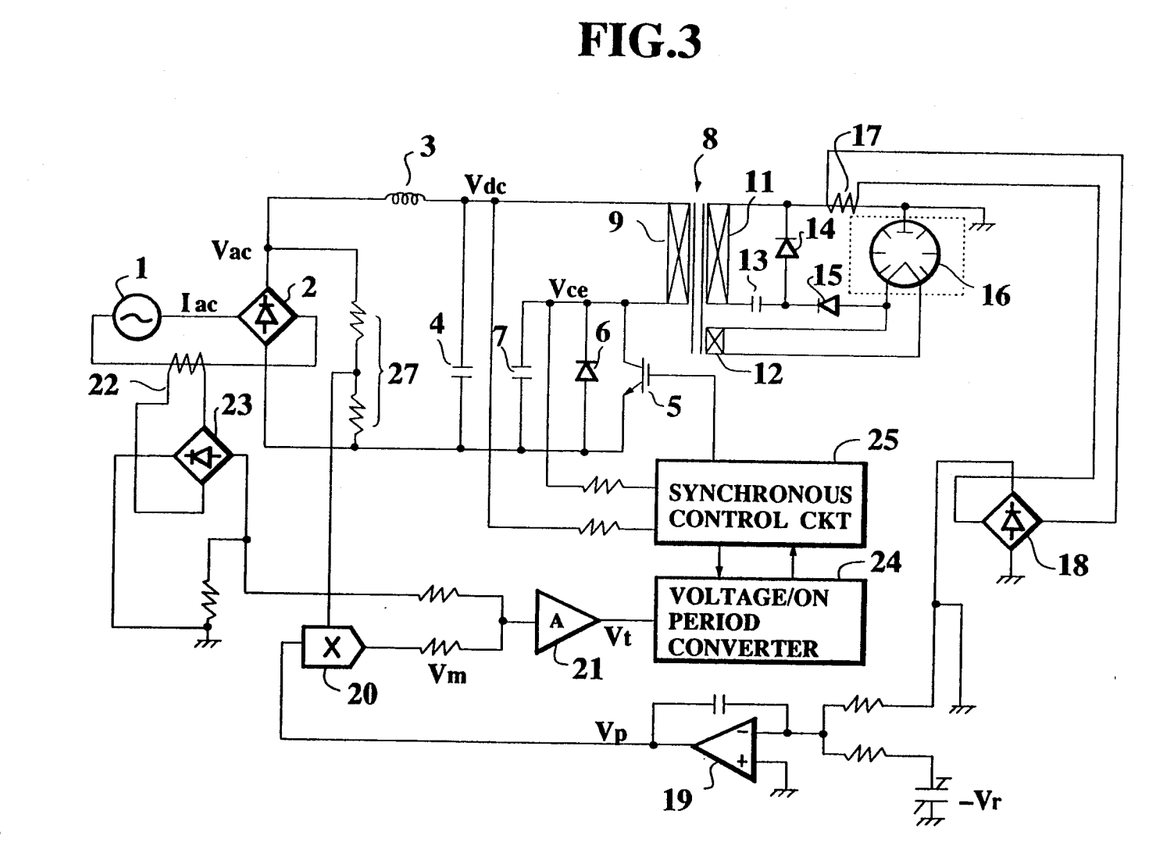
FIG. 3 shows a circuit diagram of an inverter power supply according to an embodiment of the present invention.
Figure 4:
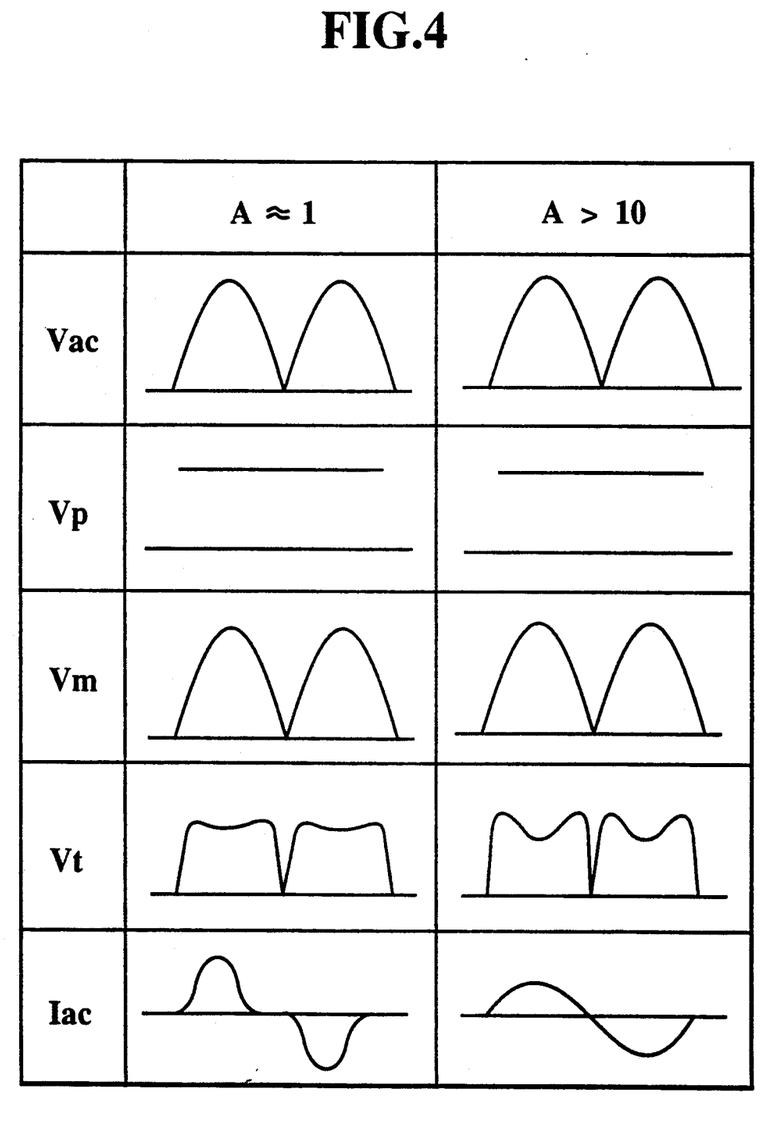
FIG. 4 shows waveforms of each signal to help describe the embodiment in FIG. 3.

With reference to FIG. 3 and FIG. 4, embodiments of the present invention will be described. The embodiments will be utilized in a single-transistor-type voltage resonant quasi E-class magnetron-driven inverter power supply apparatus.

First, the structure of inverter power supply apparatus will be described. In FIG. 3, the numeral 1 indicates a commercial A.C. power source. The A.C. voltage from the commercial AC power source 1 is rectified by a rectifying bridge 2 and is then smoothed up by a choke coil 3 and a smoothing capacitor 4 so that a D.C. voltage Vdc is obtained. The reference numeral 5 denotes a switching device comprising an IGBT (Insulated Gate Bipolar Transistor) where a free-wheeling diode 6 and a resonance capacitor 7 are provided in parallel between the collector and emitter of the switching device 5, thus constituting a resonance type switching circuit.

The reference numeral 8 denotes a high-voltage transformer of high frequency where a primary winding 9, a secondary winding 11 and a filament winding 12 are provided. The D.C. voltage is supplied to the collector of the switching device 5 through the primary winding 9 of the high-voltage transformer 8. The switching device 5 operates ON/OFF by a signal from a synchronous control circuit 25 and the D.C. voltage is periodically switched to be converted to a high frequency. Then, a resonance voltage Vce having a sinusoidal waveform appears in the collector-emitter of the switching device 5 constituting the resonance type switching circuit. The sinusoidal-waveform high frequency is supplied to the primary winding 9 of the high-voltage transformer 8. A voltage doubler rectifier circuit comprising a voltage doubler capacitor 13 and high-voltage rectifying diodes 14, 15 are connected to the secondary winding 11. In the voltage doubler rectifier circuit, the high-frequency high voltage produced in the secondary winding 11 of the high-voltage transformer 8 is voltage-doubler rectified to obtain a D.C. high voltage which then is applied as an anode voltage between an anode and cathode of the magnetron 16. A filament voltage from the filament winding 12 is supplied to a filament of the magnetron 16. The anode side of the magnetron 16 is grounded.

There is provided a control system whereby an input power to be supplied to the magnetron 16, that is, a D.C. output of the inverter power supply, is supplied with a constant value and a waveform of an A.C. input current Iac from the commercial power supply 1 is made congruent to an A.C. input voltage waveform (sinusoidal waveform).

In the control system which exercises controls to keep constant an input electric power flowing toward the magnetron 16, the input electric power is controlled to be a constant value by utilizing the characteristic that the anode voltage of the magnetron 16 is almost constant in a normal operation. In other words, the current transformer 17 which detects a mean value of the anode current is connected between the voltage doubler rectifier circuit (comprising the voltage doubler capacitor 13 and the high-voltage rectifying diodes 14, 15) and the anode of the magnetron 16. A detection output of the current transformer 17 is converted to a D.C. voltage by a rectifying bridge 18 and is then supplied to an inversion input terminal (−) of an input electric power error integrator 19. A noninverting input terminal (+) of the input electric power error integrator 19 is grounded. An electric power of −Vr is set to the noninverting input terminal (−) in order to set constant the input electric power to the magnetron 16. An electric power error voltage Vp (an output control voltage responsive to the output value of the the D.C. output) increases gradually until an error between the anode current detection value converted to the D.C. voltage by the rectifying bridge 18 and the electric power setting value −Vr becomes zero when a result of the addition of the anode current detection value and −Vr is negative; Vp decreases gradually until the error becomes zero when the result of the addition is positive.

Figure 5:
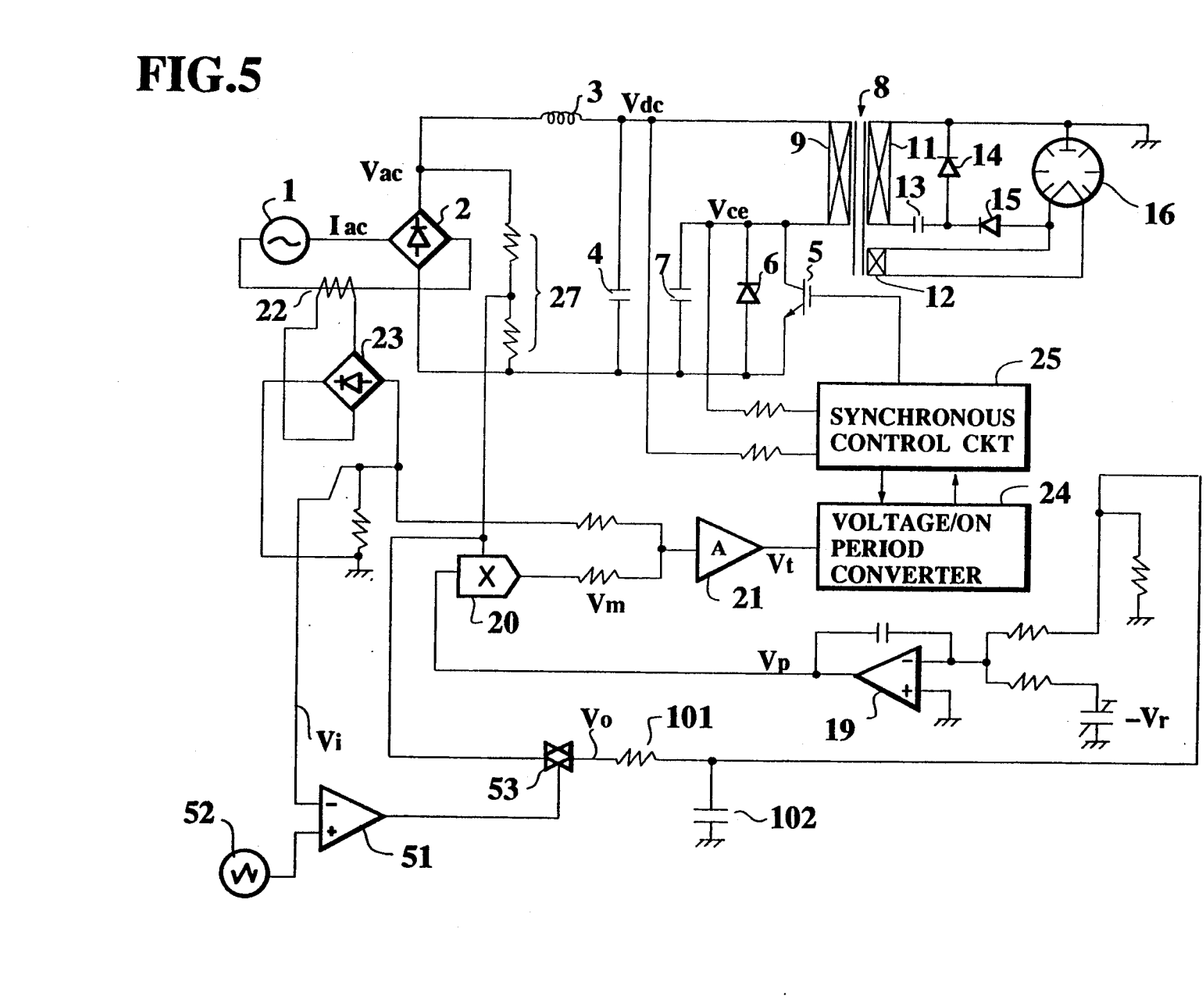
FIG. 5 shows a circuit diagram of a high-frequency converter in an inverter power supply according to the present invention.

In the present invention as shown in FIG. 5, a detection output V1 of input current detection means constituted by a current transformer 22 and a rectifier 23 is fed to a noninverting input terminal (−) of a comparator 51 serving as comparison means. A triangular wave, having a predetermined amplitude and period, supplied from a linear triangular wave generator 52 is provided to the inversion input terminal (+) of the comparator 51. Then, the detection output V1 and the triangular wave are compared in the comparator 51 to obtain a comparison output of a pulse shape. The comparison output drives an analog switch 53.

On the other hand, an input voltage detector 19 is connected in parallel to the commercial A.C. power source 1. An output of the input voltage detector 19 is converted to a D.C. voltage by a rectifier 20 which constitutes the input voltage detection means together with the input voltage detector 19. The converted D.C. voltage is inputted to the analog switch 53.

An integrator circuit comprising a resistor 101 and a capacitor 102 is connected to a terminal of the analog switch 53. In the integrator, an averaged value of switching output $V_o$ of the analog switch 53 is obtained. A drive signal for controlling ON period of a switching device of inverter circuit responsive to the average value of the switching output $V_o$ is outputted from a voltage/ON period converter 24.

Figure 6:
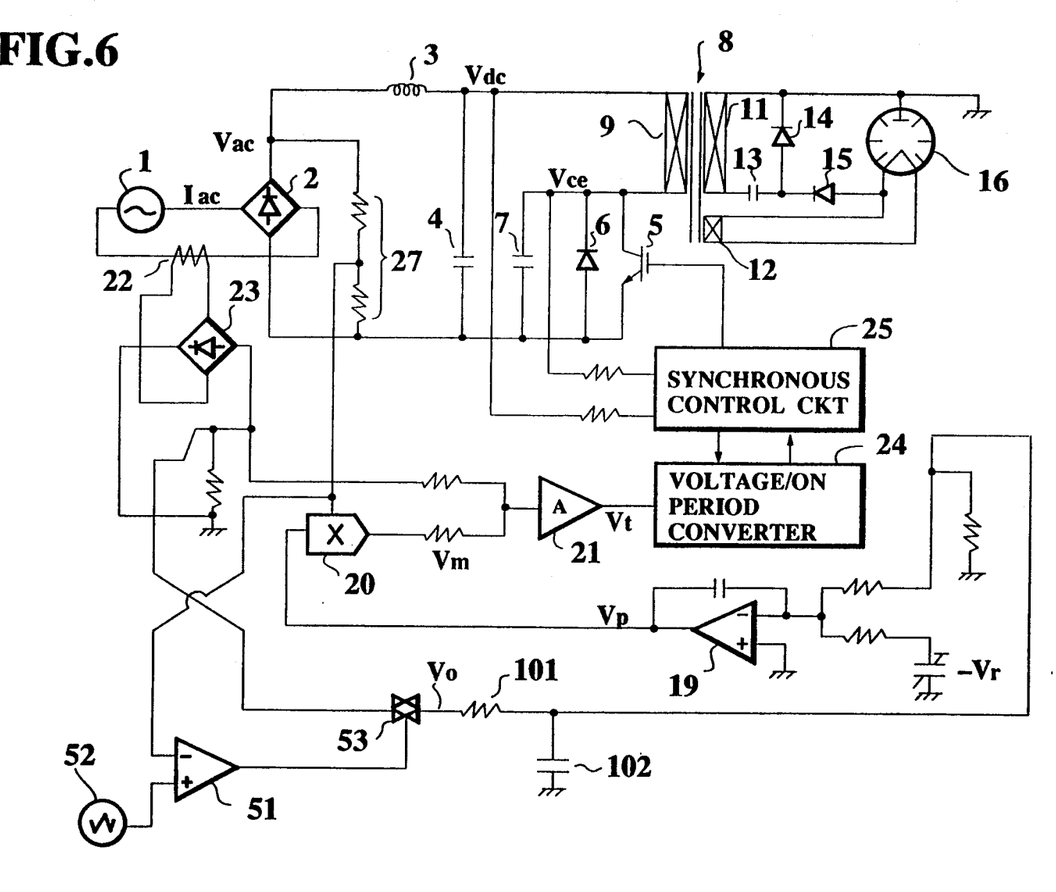
FIG. 6 shows a circuit diagram of another high-frequency converter in the inverter power supply according to the present invention.
Figure 7:
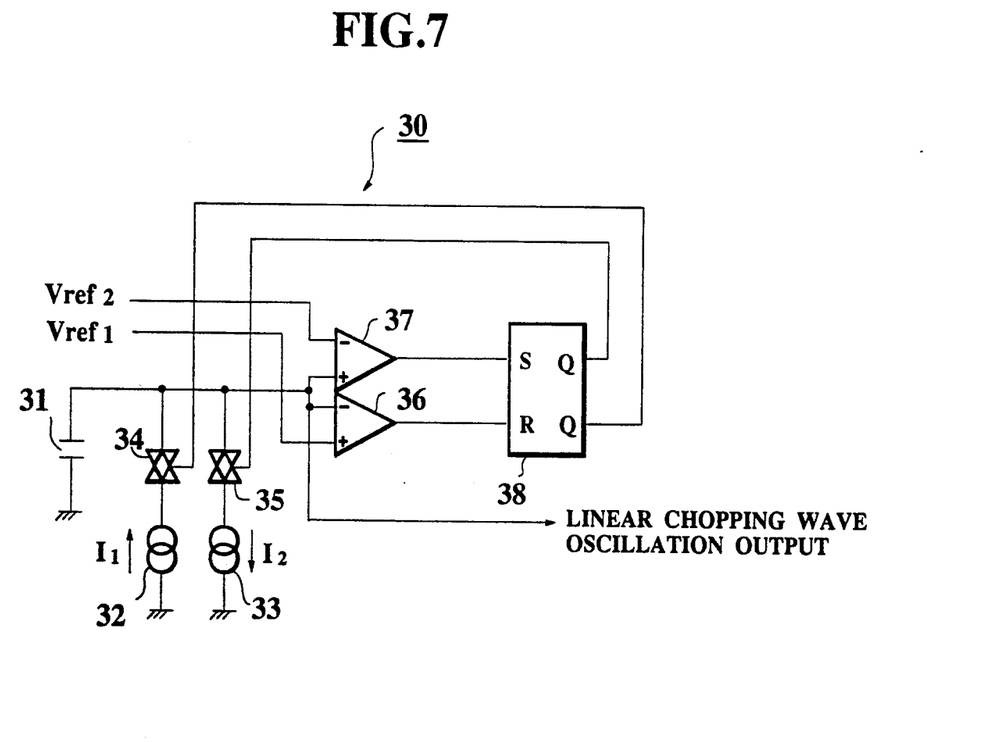
FIG. 7 shows a circuit diagram of a linear triangular wave generator of the high-frequency converter in FIG. 5 and FIG. 6.

FIG. 7 shows a circuit diagram of the linear triangular wave generator 52 shown in FIG. 5 and FIG. 6. The linear triangular wave generator 52 comprises a capacitor 31 for charge/discharge, current source 32, 33, analog switches 34, 35, the first and second comparators 36, 37 and an R-S (Reset/Set) flip-flop 38. Both the inverting input terminal (−) of the first comparator 36 and the noninverting input terminal (+) of the comparator 37 are connected to a nongrounded electrode of the capacitor 31. The threshold voltage Vref1 is set to zero volt in the noninverting input terminal (+) of the first comparator 36, whereas the threshold voltage Vref2 in the inverting input terminal of the second comparator 37 is set at a predetermined (+) volt responsive to the peak magnitude of the triangular wave. The analog switches 34, 35 are driven by an output of the RS flip-flop 38. The two current sources 32, 33 are alternately switched to repeatedly charge/discharge the capacitor 31, so that obtained is the triangular wave having an amplitude whose top and bottom peak magnitudes are threshold values of Vref2 and Vref1, respectively.

If should be appreciated that a linear saw-tooth-wave generator may serve as the triangular wave generating means.

FIG. 6 shows a modified embodiment of FIG. 5. In this embodiment, a detection output of the input current detection means is inputted to the analog switch 53, and the detection output of the input voltage is provided to the noninverting input terminal (+) of the comparator 51. In other words, the detection outputs from the input current detection means and the input voltage detection means are interchanged in comparison with FIG. 5.

In the above embodiment shown in FIG. 6, a switching output $V_o$ of the analog switch has a pulse width proportional to a detection output value of the input voltage detection means, and the $V_o$ has a pulse amplitude proportional to a detection output of the input current detection means. On the other hand, the average value of the switching output is proportional to the product of the input voltage and the input current from the commercial A.C. power source 1. Therefore, the input power supplied to the magnetron 16 is controlled at a constant level.

Referring back to the inverter power supply in FIG. 3, the electric power error voltage Vp from the input electric power error integrator 19 is inputted to the multiplier 20 serving as modulation means. In the multiplier 20, the A.C. input voltage Vac is voltage-divided at a predetermined value by a voltage divider circuit comprising resistors 27. The power error voltage Vp is amplitude-modulated by the A.C. input voltage Vac to obtain an object input current waveform Vm. The object input current waveform Vm from the multiplier 20 is inputted to an amplifier 21 serving as difference output means. In the amplifier 21, inputted is the A.C. input current detection value (negative value) from the commercial A.C. power supply 1 detected through the current transformer 22 and the rectifying bridge 23. Furthermore, in the amplifier 21, the difference is taken between the absolute values of the object input current waveform and the A.C. current detection value, and the result of the difference is multiplied by a constant A as shown in the following equation and indicated under numeral 21 in FIG. 3 to obtain a difference voltage Vt. A indicates a GAIN of the amplifier 21.

$$A((P-Vr) \times |Vac|) - |Iac|) = Vt$$

where,

P−Vr represents Vm that is the object input current waveform,

Vac represents A.C. input voltage, and

Iac represents A.C. input current.

The difference voltage Vt is inputted to the voltage-/ON-period converter 24 serving as control means. From the voltage/ON-period converter 24, outputted is a drive signal that serves to control the ON period of the switching device 5 responsive to the difference voltage Vt from the amplifier 21. The reference numeral 25 denotes a synchronous control circuit whereby switching loss is minimized by operating ON drive of the switching device 5 by means of proper timing or the like such that the resonance voltage Vce is smaller that the D.C. voltage Vdc.

With reference to FIG. 4 together with FIG. 3, the operation and function of the inverter power supply so far described will be explained.

An average value of the anode current of the magnetron 16 is detected out by the current transformer 17 and the rectifying bridge 18. From the input electric power error integrator 19, outputted is the electric power error voltage Vp responsive to the difference between said anode current detection value and the electric power setting value −Vr. In the multiplier 20, the electric power error voltage Vp is amplitude-modulated by the A.C. input voltage Vac from the commercial power supply 1, so that the object input current waveform Vm is obtained. In the amplifier 21, the object input current waveform Vm and the real A.C. input current detection waveform Iac detected by the current transformer 22, etc. are compared by taking the difference between the absolute values of Vm and Iac, so that the difference voltage Vt is obtained. Then, in the voltage/ON-period converter 24 an ON period is obtained responsive to said difference voltage Vt, and the timing of ON drive is taken in the synchronous control circuit 25, so that the switching device 5 is driven ON/OFF. Consequently, the electric power error voltage Vp is controlled to be zero thus the input electric power to the magnetron 16 is controlled at a constant level, so that the magnetron 16 operates under optimal condition. At the same time, the waveform of the A.C. input current Iac from the commercial power supply 1 is controlled so that it is congruent to the sinusoidal waveform of A.C. input voltage Vac. FIG. 4 teaches that when the amplifying level, that is the GAIN, is big enough, for example, more than 10, the A.C. input current Iac is guaranteed for a waveform in the neighborhood of zero level thus being congruent to the waveform of the A.C. input voltage Vac.

In summary, according to the present invention, there are provided modulation means where an output control voltage responsive to an output value of A.C. output is amplitude-modulated by an A.C. input voltage from a commercial A.C. power supply so as to be an object input waveform, differential output means where the object input waveform obtained form said modulation means and the input current waveform from the commercial A.C. power supply are taken difference therebetween, and control means where an ON period of a switching device is controlled responsive to said differential output means, so that the current output is controlled to be a predetermined value realized by a single inverter construction and the input current waveform from the commercial AC power supply is controlled to be a similar figure with the sinusoidal waveform of the A.C. input voltage. Therefore, the present invention realizes a simply constructed and high efficient inverter power supply apparatus.

Besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method wherein an A.C. voltage from an A.C. power source is rectified to obtain a D.C. voltage which then is switched periodically by a switching device to be converted to a high frequency which then is converted to D.C. to obtain a predetermined D.C. output from an inverter power supply, the method comprising the steps of:

(a) amplitude-modulating an output control voltage in response to an output value of the D.C. output by an A.C. input voltage from the A.C. power source to obtain an object input waveform;

(b) taking a difference between the object input waveform obtained by the amplitude modulating and an input current waveform from the A.C. power source;

(c) controlling an ON period of the switching device responsive to the difference obtained in step (b); and (d) in an input power detection means, controlling power supplied to a magnetron, by:
  (i) generating a detection output in response to the input voltage from the A.C. power supply;
  (ii) generating a detection output in response to the input current from the A.C. power supply;
  (iii) generating a triangular wave having a predetermined amplitude and period;
  (iv) comparing the detection output from either the input voltage detection means or the input current detection means, with the triangular wave generated;

in a switching means, switching the detection output not compared; and controlling an ON-period of the switching device responsive to an output of the switching means.

2. An inverter power supply wherein an A.C. voltage from an A.C. power source is rectified to obtain a D.C. voltage which then is switched periodically by a switching device to be converted to a high frequency which then is converted to D.C. to obtain a predetermined D.C. output, the inverter power supply comprising:

modulation means for amplitude-modulating an output control voltage responsive to an output value of the D.C. output by an A.C. input voltage from the commercial A.C. power source to obtain an object input waveform;

difference output means for taking a difference between the object input waveform obtained by the modulation means and an input current waveform from the commercial A.C. power source;

first control means for controlling an ON period of the switching device responsive to a difference output from the difference output means; and input power detection means for controlling power supplied to a magnetron, comprising:

input voltage detection means for generating a detection output responsive to the input voltage from the commercial A.C. power supply;

input current detection means for generating a detection output responsive to the input current from the commercial A.C. power supply;

triangular wave generating means for generating a triangular wave having a predetermined amplitude and period;

compare means for comparing the detection output from either the input voltage detection means or the input current detection means, with the triangular wave generated from the triangular wave generating means;

switching means for switching the detection output not compared at the compare means; and second control means for controlling an ON-period of the switching device responsive to an output of the switching means.

3. The inverter power supply according to claim 2, wherein the triangular wave generating means comprises a capacitor for charge and discharge; a plurality of analog switches connected to the capacitor; a plurality of current sources connected to the respective plurality of the analog switches; first and second comparators connected to the analog switches; and a R-S (reset-set) flip-flop, connected to the comparators and the plurality of analog switches, for driving the plurality of analog switches.

4. The inverter power supply according to claim 2, wherein the triangular wave generating means includes a linear sawtooth-wave generator.

* * * * *